(12) United States Patent
Park et al.

(10) Patent No.: US 8,106,877 B2
(45) Date of Patent: Jan. 31, 2012

(54) APPARATUS AND METHOD FOR DRIVING LIQUID CRYSTAL DISPLAY DEVICE

(75) Inventors: Sin Kyun Park, Gyeonggi-do (KR); Jung Hyeok Yun, Daegu (KR)

(73) Assignee: LG Display Co., Ltd., Seoul (KR)

( * ) Notice: Subject to any disclaimer, the term of this patent is extended or adjusted under 35 U.S.C. 154(b) by 1171 days.

(21) Appl. No.: 11/898,168

(22) Filed: Sep. 10, 2007

(65) Prior Publication Data
US 2008/0088562 A1 Apr. 17, 2008

(30) Foreign Application Priority Data
Oct. 12, 2006 (KR) .................. 10-2006-0099384

(51) Int. Cl.
*G09G 3/36* (2006.01)
(52) U.S. Cl. .......... 345/102; 345/87; 345/211; 345/213; 323/282
(58) Field of Classification Search ............ 345/87–102, 345/211, 213; 323/282
See application file for complete search history.

(56) References Cited

U.S. PATENT DOCUMENTS

| | | | | |
|---|---|---|---|---|
| 5,105,127 | A * | 4/1992 | Lavaud et al. | 315/291 |
| 6,429,839 | B1 * | 8/2002 | Sakamoto | 345/87 |
| 2005/0269973 | A1 * | 12/2005 | Jang et al. | 315/307 |
| 2006/0007103 | A1 * | 1/2006 | Oh et al. | 345/102 |
| 2006/0279521 | A1 * | 12/2006 | Lin | 345/102 |
| 2007/0120499 | A1 * | 5/2007 | Shimura et al. | 315/277 |
| 2007/0236153 | A1 * | 10/2007 | Chen | 315/224 |

* cited by examiner

*Primary Examiner* — Alexander Eisen
*Assistant Examiner* — Viet Pham
(74) *Attorney, Agent, or Firm* — Morgan, Lewis & Bockius LLP (57) ABSTRACT

A driving apparatus of a liquid crystal display device for reducing or automatically restoring a driving current of a light source by being inversed or re-inversed a phase of a driving current with which a light source of a liquid crystal display device is supplied by the human body is disclosed.

In the driving apparatus of the liquid crystal display device, a driving controller reduces or restores a duty ratio of a driving control signal which controls a generation of a driving current of a backlight assembly in accordance with whether a predetermined enable signal is applied or not. A master inverter reduces or restores a level of a driving current of the backlight assembly in accordance with a duty ratio of a driving control signal from the driving controller. A slave inverter reduces or restores a level of a driving current of the backlight assembly in accordance with a duty ratio of the driving control signal. And a current limiting circuit applies the predetermined enable signal to a ground or the driving controller in accordance with a phase of feedback currents of the master inverter and the slave inverter.

18 Claims, 5 Drawing Sheets

APPARATUS AND METHOD FOR DRIVING LIQUID CRYSTAL DISPLAY DEVICE

This application claims the benefit of Korean Patent Application No. P2006-099384 filed in Korea on Oct. 12, 2006, which is hereby incorporated by reference.

BACKGROUND OF THE INVENTION

1. Field of the Invention

The present invention relates to a liquid crystal display device, and more particularly to a driving apparatus of a liquid crystal display device that is adaptive for reducing or automatically restoring a driving current of a light source in case that a phase of a driving current with which a light source of a liquid crystal display device is supplied is inversed or re-inversed by the human body, and a driving method thereof.

2. Description of the Related Art

Generally, a liquid crystal display device controls light transmittance of liquid crystal cells in accordance with video signals to thereby display a picture. An active matrix type of liquid crystal display device having a switching device provided for each liquid crystal cell is advantageous for an implementation of moving picture because it permits an active control of the switching device. The switching device used for the active matrix liquid crystal display device mainly employs a thin film transistor (hereinafter, referred to as "TFT") as shown in FIG. 1.

Figure 1:
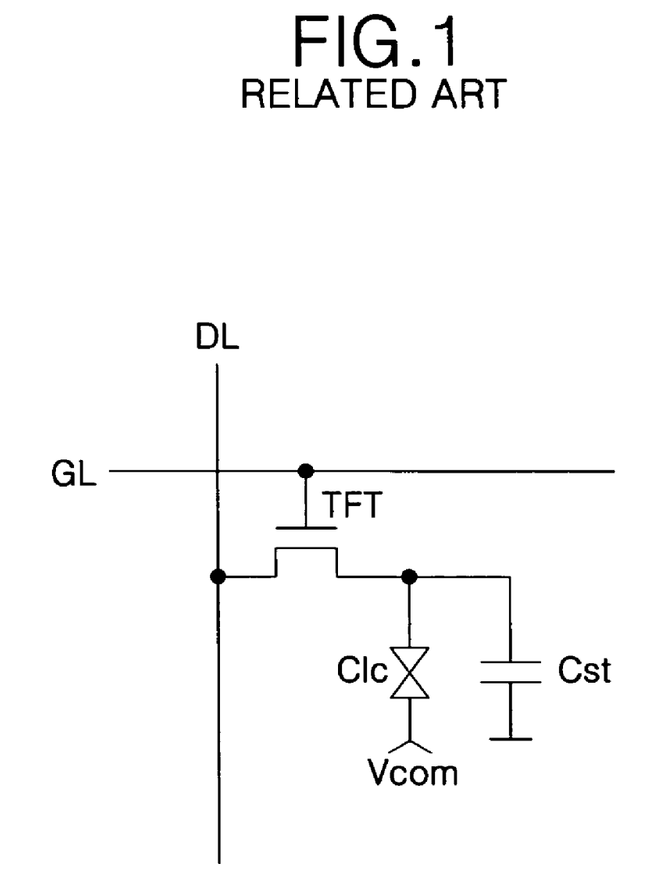
FIG. 1 is an equivalent circuit diagram showing a pixel provided at a liquid crystal display device of the related art.

Referring to FIG. 1, the liquid crystal display device of the active matrix type converts a digital input data into an analog data voltage on the basis of a gamma reference voltage to supply it to a data line DL and, at the same time supply a scanning pulse to a gate line GL, thereby charging a liquid crystal cell Clc.

A gate electrode of the TFT is connected to the gate line GL, a source electrode is connected to the data line DL, and a drain electrode of the TFT is connected to a pixel electrode of the liquid crystal cell Clc and one end electrode of a storage capacitor Cst.

A common electrode of the liquid crystal cell Clc is supplied with a common voltage Vcom.

When the TFT is turned-on, the storage capacitor Cst charges a data voltage applied from the data line DL to constantly maintain a voltage of the liquid crystal cell Clc.

If the gate pulse is applied to the gate line GL, the TFT is turned-on to define a channel between the source electrode and the drain electrode, thereby supplying a voltage on the data line DL to the pixel electrode of the liquid crystal cell Clc. In this case, liquid crystal molecules of the liquid crystal cell Clc are arranged by an electric field between the pixel electrode and the common electrode to modulate an incident light.

Figure 2:
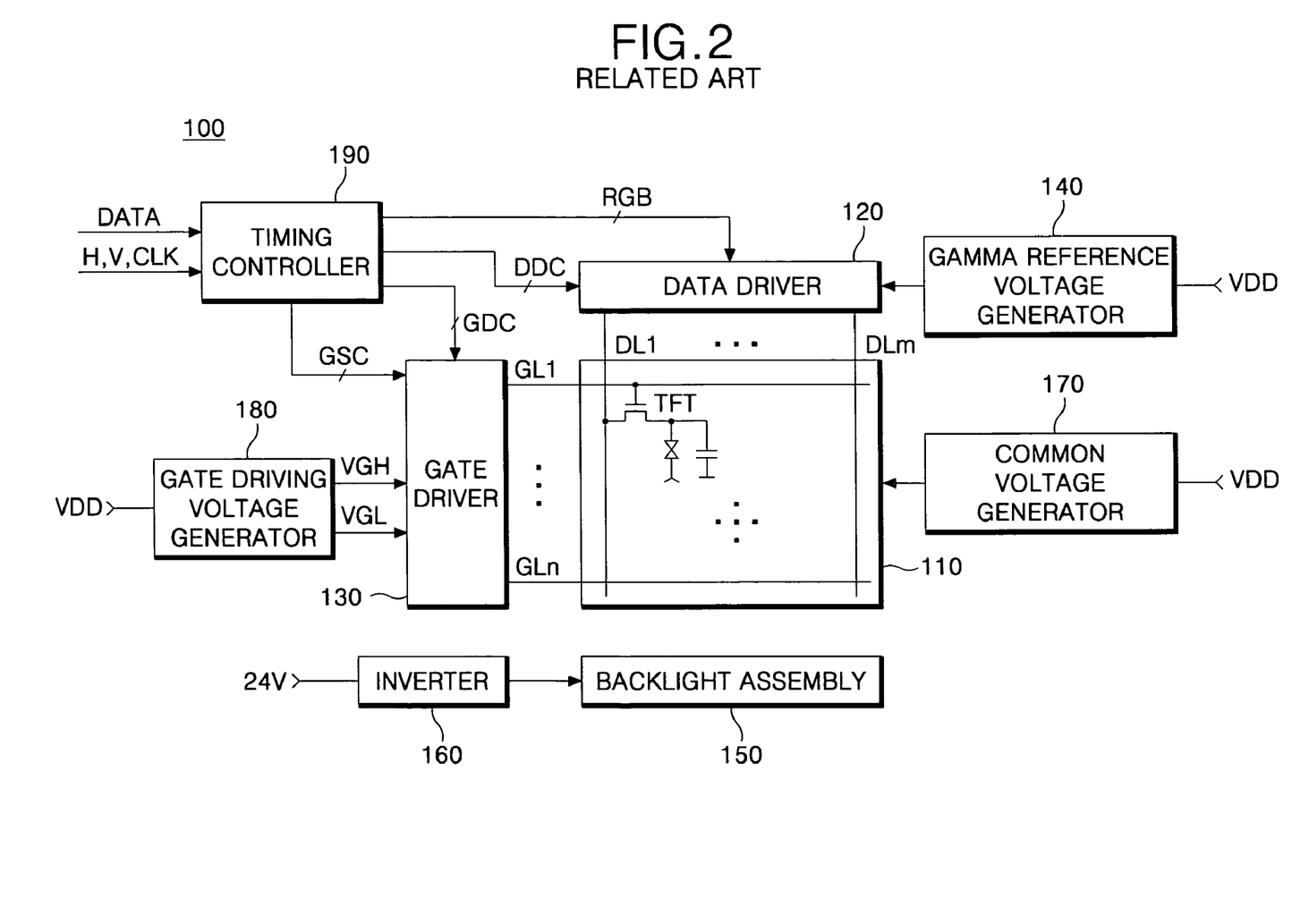
FIG. 2 is a block diagram showing a configuration of the liquid crystal display device of the related art.

A configuration of a liquid crystal display device of a related art including pixels which have such a structure is the same as shown in FIG. 2.

FIG. 2 is a block diagram showing a configuration of a liquid crystal display device of the related art.

Referring to FIG. 2, the liquid crystal display device 100 of the related art includes a liquid crystal display panel 110, a data driver 120, a gate driver 130, a gamma reference voltage generator 140, a backlight assembly 150, an inverter 160, a common voltage generator 170, a gate driving voltage generator 180, and a timing controller 190. Herein, the data driver 120 supplies a data to the data lines DL1 to DLm of the liquid crystal display panel 110. The gate driver 130 supplies a scanning pulse to the gate lines GL1 to GLn of the liquid crystal display panel 110. The gamma reference voltage generator 140 generates a gamma reference voltage to supply it to the data driver 120. The backlight assembly 150 irradiates a light onto the liquid crystal display panel 110. The inverter 160 applies an AC voltage and a current to the backlight assembly 150. The common voltage generator 170 generates a common voltage Vcom to supply it to the common electrode of the liquid crystal cell Clc of the liquid crystal display panel 110. The gate driving voltage generator 180 generates a gate high voltage VGH and a gate low voltage VGL to supply them to the gate driver 130. The timing controller 190 controls the data driver 120 and the gate driver 130.

The liquid crystal display panel 110 has a liquid crystal dropped between two glass substrates. On the lower glass substrate of the liquid crystal display panel 110, the data lines DL1 to DLm and the gate lines GL1 to GLn perpendicularly cross each other. Each intersection between the data lines DL1 to DLm and the gate lines GL1 to GLn is provided with the TFT. The TFT supplies a data on the data lines DL1 to DLm to the liquid crystal cell Clc in response to the scanning pulse. The gate electrode of the TFT is connected to the gate lines GL1 to GLn while the source electrode thereof is connected to the data line DL1 to DLm. Further, the drain electrode of the TFT is connected to the pixel electrode of the liquid crystal cell Clc and to the storage capacitor Cst.

The TFT is turned-on in response to the scanning pulse applied, via a gate line which is connected to a gate terminal thereof among the gate lines GL1 to GLn, to the gate terminal. Upon turning-on of the TFT, a video data on the data line which is connected to a drain terminal of the TFT among the data lines DL1 to DLm is supplied to the pixel electrode of the liquid crystal cell Clc.

The data driver 120 supplies a data to the data lines DL1 to DLm in response to a data driving control signal DDC which is supplied from the timing controller 190. Further, the data driving circuit 120 converts digital video data RGB which are supplied from the timing controller 190 into an analog data voltage on the basis of a gamma reference voltage which is supplied from the gamma reference voltage generator 140 to supply it to the data lines DL1 to DLm. Herein, an analog data voltage is realized as a gray scale at the liquid crystal cell Clc of the liquid crystal display panel 110.

The gate driver 130 sequentially generates a scanning pulse in response to a gate driving control signal GDC and a gate shift clock GSC which are supplied from the timing controller 190 to supply them to the gate lines GL1 to GLn. In this case, the gate driver 130 determines a high level voltage and a low level voltage of the scanning pulse in accordance with the gate high voltage VGH and the gate low voltage VGL which are supplied from the gate driving voltage generator 180.

The gamma reference voltage generator 140 receives a high-level power voltage VDD to generate a positive gamma reference voltage and a negative gamma reference voltage to output them to the data driver 120.

The backlight assembly 150 is provided at the rear side of the liquid crystal display panel 110, and is radiated by an AC voltage and a current which are supplied from the inverter 160 to irradiate a light onto each pixel of the liquid crystal display panel 110.

The inverter 160 converts a square wave signal generated at the interior thereof into a triangular wave signal, and then compares the triangular wave signal with a direct current power voltage VCC supplied from the system to generate a burst dimming signal proportional to the result. If the burst dimming signal is generated, then a driving integrated circuit IC (not shown) within the inverter 160 controls a generation of AC voltage and current supplied to the backlight assembly 150 in accordance with the burst dimming signal.

The common voltage generator 170 receives a high-level power voltage VDD to generate a common voltage Vcom, and supplies it to the common electrode of the liquid crystal cells Clc provided at each pixel of the liquid crystal display panel 110.

The gate driving voltage generator 180 is supplied with a high-level power voltage VDD to generate the gate high voltage VGH and the gate low voltage VGL, and supplies them to the gate driver 130. Herein, the gate driving voltage generator 180 generates a gate high voltage VGH more than a threshold voltage of the TFT provided at each pixel of the liquid crystal display panel 110 and a gate low voltage VGL less then the threshold voltage of the TFT. The gate high voltage VGH and the gate low voltage VGL generated in this manner are used for determining a high level voltage and a low level voltage of the scanning pulse generated by the gate driver 130, respectively.

The timing controller 190 supplies digital video data RGB which are supplied from a system such as a TV set or a computer monitor, etc to the data driver 120. Furthermore, the timing controller 190 generates a data driving control signal DCC and a gate driving control signal GDC using horizontal/vertical synchronization signals H and V from a system in response to a clock signal CLK from a system to supply them to the data driver 120 and the gate driver 130, respectively. Herein, the data driving control signal DDC includes a source shift clock SSC, a source start pulse SSP, a polarity control signal POL, and a source output enable signal SOE, etc. The gate driving control signal GDC includes a gate start pulse GSP and a gate output enable signal GOE, etc.

Since the liquid crystal display device having such a configuration and a function cannot automatically adjust an output current of the inverter 160 that generates a high-level current. Thus, the human body is damaged by a high-level current in the case where a high-level current which is generated from the inverter 160 is applied to the human body when the user tests or uses a product.

SUMMARY OF THE INVENTION

The present invention is to solve the above-mentioned problem. Accordingly, it is an object of the present invention to provide a driving apparatus of a liquid crystal display device that is adaptive for reducing or automatically restoring a driving current of a light source in case that a phase of a driving current with which a light source of a liquid crystal display device is supplied is inversed or re-inversed by the human body, and a driving method thereof.

It is another object of the present invention to provide a driving apparatus of a liquid crystal display device that is adaptive for reducing or automatically restoring a driving current of a light source in case that a phase of a driving current with which a light source of a liquid crystal display device is supplied is inversed or re-inversed by the human body, to prevent the user from being damaged by a driving current of a light source, and a driving method thereof.

In order to achieve these and other objects of the invention, a driving apparatus of a liquid crystal display device according to the present invention comprises a driving controller that reduces or restores a duty ratio of a driving control signal which controls a generation of a driving current of a backlight assembly in accordance with whether a predetermined enable signal is applied or not; a master inverter that reduces or restores a level of a driving current of the backlight assembly in accordance with a duty ratio of a driving control signal from the driving controller; a slave inverter that reduces or restores a level of a driving current of the backlight assembly in accordance with a duty ratio of the driving control signal; and a current limiting circuit that applies the predetermined enable signal to a ground or the driving controller in accordance with a phase of feedback currents from the master inverter and the slave inverter.

In the driving apparatus of the liquid crystal display device, the driving control signal is a pulse width modulation signal.

If a supply of the predetermined enable signal is cut-off, the driving controller reduces a duty ratio of the pulse width modulation signal.

If a duty ratio of the pulse width modulation signal is reduced, the master inverter and the slave inverter reduce a level of a driving current of the backlight assembly proportional to the reduced duty ratio.

If the cut-off predetermined enable signal is re-supplied, the driving controller restores a duty ratio of the pulse width modulation signal.

If a duty ratio of the pulse width modulation signal is restored, the master inverter and the slave inverter restore a level of a driving current of the backlight assembly.

If feedback currents which are fed back from the master inverter and the slave inverter have an anti-phase, the current limiting circuit applies the predetermined enable signal to a ground.

If feedback currents which are fed back from the master inverter and the slave inverter have the same phase, the current limiting circuit applies the predetermined enable signal to the driving controller.

The current limiting circuit includes a first transistor that is turned-on/turned-off by a feedback current from the master inverter; a second transistor that is turned-on/turned-off by a feedback current from the slave inverter; a field effect transistor that is driven by a power voltage which is applied when the first and second transistors are alternatively turned-on/turned-off; and a third transistor that is turned-on by a current which is generated by the power voltage which is applied when the field effect transistor is turned-off to switch the predetermined enable signal to a ground.

A driving apparatus of a liquid crystal display device according to the present invention, including a master inverter and a slave inverter that supply a driving current to a backlight assembly, and a driving controller that controls a driving of the master inverter and the slave inverter comprises a current limiting circuit that applies a predetermined enable signal to a ground or a driving controller in accordance with a phase of feedback currents from the master inverter and the slave inverter, and the current limiting current includes a first switching device that is turned-on/turned-off by a feedback current from the master inverter; a second switching device that is turned-on/turned-off by a feedback current from the slave inverter; a third switching device that is driven by a power voltage which is applied when the first and second switching devices are alternatively turned-on/turned-off; and a fourth switching device that is turned-on by a current which is generated by the power voltage which is applied when the switching device is turned-off to switch the predetermined enable signal to a ground.

The first switching device is a bipolar transistor having a base to which a feedback current is applied from the master inverter, a collector which is connected to a first node to which the power voltage is applied, and an emitter which is connected to the second switching device.

The second switching device is a bipolar transistor having a base to which a feedback current is applied from the slave inverter, a collector which is connected to an emitter of the first switching device, and an emitter which is connected to a ground.

The third switching device is a field effect transistor having a base which is connected to the first node to which the power voltage is applied, a drain which is connected to a second node to which the power voltage is applied, and a source which is connected to a ground.

The fourth switching device is a bipolar transistor having a base which is connected to the second node to which the power voltage is applied, a collector to which the predetermined enable signal is applied, and an emitter which is connected to a ground.

A method of driving a liquid crystal display device according to the present invention comprises generating a driving control signal that controls a generation of a driving current of a backlight assembly; generating a first and second driving currents to supply them to the backlight assembly and feeding back the first and second driving currents in accordance with the driving control signal; and reducing or restoring a duty ratio of the driving control signal in accordance with a phase of the fed back first and second driving currents.

In the method, the driving control signal is a pulse width modulation signal.

In the method, the step of reducing or restoring a duty ratio of the driving control signal reduces a duty ratio of the pulse width modulation signal if a phase of the fed back first driving current is different from a phase of the fed back second driving current.

In the method, the step of reducing or restoring a duty ratio of the driving control signal restores a duty ratio of the pulse width modulation signal if a phase of the fed back first driving current is the same as a phase of the fed back second driving current in a state in which a duty ratio of the pulse width modulation signal is reduced.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Hereinafter, the preferred embodiments of the present invention will be described in detail with reference to the accompanying drawings.

Figure 3:
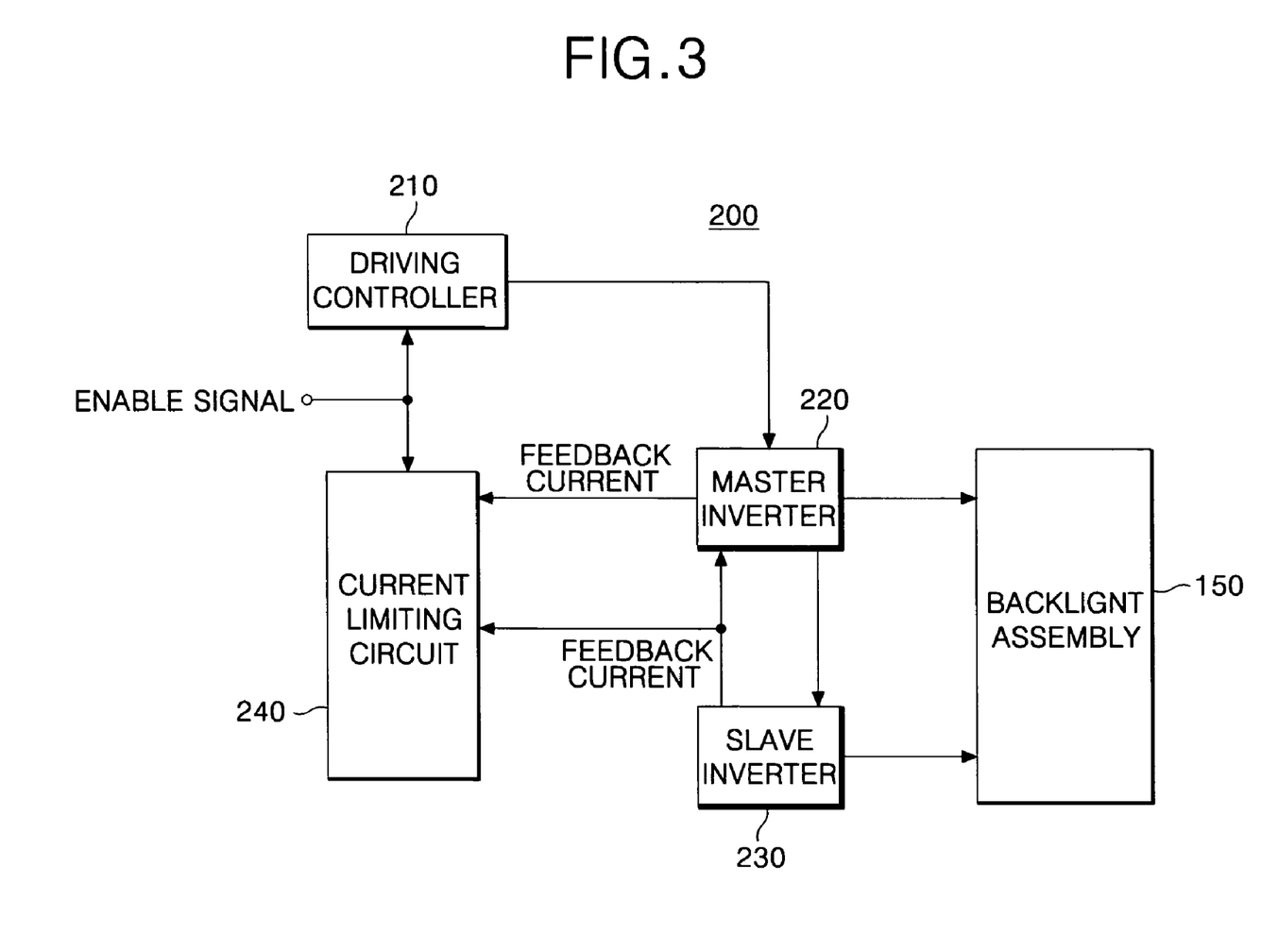
FIG. 3 is a diagram showing a configuration of a driving apparatus of a liquid crystal display device according to an embodiment of the present invention.

FIG. 3 is a diagram showing a configuration of a driving apparatus of a liquid crystal display device according to an embodiment of the present invention.

Referring to FIG. 3, a driving apparatus 200 of a liquid crystal display device of the present invention includes a driving controller 210, a master inverter 220, a slave inverter 230, and a current limiting circuit 240 LCC. Herein, the driving controller 210 reduces or restores a duty ratio of a driving control signal that controls a generation of a driving current of the backlight assembly 150 in accordance with whether a predetermined enable signal is applied or not. The master inverter 220 reduces or restores a level of a driving current of the backlight assembly 150 in accordance with a duty ratio of a driving control signal from the driving controller 210. The slave inverter 230 reduces or restores a level of a driving current of the backlight assembly 150 in accordance with a duty ratio of a driving control signal which is supplied via the master inverter 220. The current limiting circuit 240 applies a predetermined enable signal to a ground or the driving controller 210 in accordance with a phase of feedback currents from the master inverter 220 and the slave inverter 230. In this case, the driving control signal is a pulse width modulation signal PWM.

The driving controller 210 supplies a pulse width modulation signal having a duty ratio of an initial state to the master inverter 220 in accordance with a predetermined enable signal which is applied at an initial driving state of the backlight assembly 150. In this way, if a predetermined enable signal is applied to the driving controller 210, the driving controller 210 maintains a duty ratio of a pulse width modulation signal with which the master inverter 220 is supplied to 100%.

The driving controller 210 reduces a duty ratio of a pulse width modulation signal to decrease a driving current of the backlight assembly 150 which is supplied from the master inverter 220 and the slave inverter 230 in the case where a predetermined enable signal is applied to a ground and is not supplied to the driving controller 210 by the current limiting circuit 240.

The master inverter 220 increases and decreases a level of a driving current of the backlight assembly 150 in accordance with a duty ratio of a pulse width modulation signal which is supplied from the driving controller 210. If a pulse width modulation signal having a duty ratio of 100% similar to a duty ratio of an initial state is inputted, the master inverter 220 supplies the highest-level driving current to the backlight assembly 150 and supplies a pulse width modulation signal having a duty ratio of 100% to the slave inverter 230.

If a duty ratio of a pulse width modulation signal is reduced by the driving controller 210, the master inverter 220 reduces a driving current of the backlight assembly 150 and supplies a pulse width modulation signal having the reduced duty ratio to the slave inverter 230 proportional to the reduced duty ratio. In this state, if a duty ratio of a pulse width modulation signal is increased to 100% by the driving controller 210, the master inverter 220 restores a driving current of the backlight assembly 150 to the highest-level driving current and, at the same time supplies a pulse width modulation signal having a duty ratio of 100% to the slave inverter 230 in accordance with a pulse width modulation signal having a duty ratio of 100%. On the other hand, the master inverter 220 is fed back with a driving current which is outputted from the slave inverter 230, and feeds back a driving current which is outputted from the master inverter 220 to the current limiting circuit 240.

The slave inverter 230 increases and decreases a level of a driving current of the backlight assembly 150 in accordance with a duty ratio of a pulse width modulation signal which is supplied via the master inverter 220. If a pulse width modulation signal having a duty ratio of 100% similar to a duty ratio of an initial state is inputted, the slave inverter 230 supplies the highest-level driving current to the backlight assembly 150 and, at the same time feeds back the highest-level driving current to the master inverter 220 and the current limiting circuit 240.

If a duty ratio of a pulse width modulation signal is reduced, the slave inverter 230 reduces a driving current of the backlight assembly 150 and, at the same time feeds back the driving current to the master inverter 220 and the current limiting circuit 240 proportional to the reduced duty ratio. In this state, if a duty ratio of a pulse width modulation signal is increased to 100%, the slave inverter 230 restores a driving current of the backlight assembly 150 to the highest-level driving current and, at the same time feeds back the driving current to the master inverter 220 and the current limiting circuit 240 in accordance with a pulse width modulation signal having a duty ratio of 100%.

Figure 4:
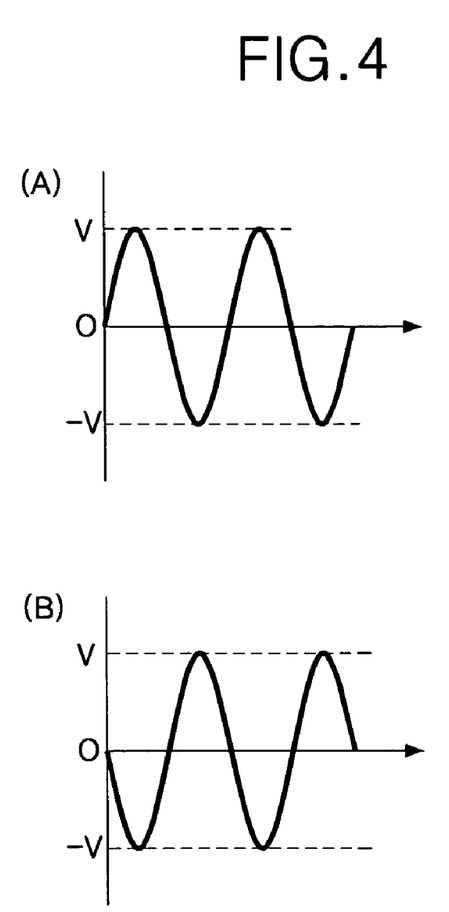
FIG. 4 is a diagram showing a characteristics of a current which is outputted from the master inverter and the slave inverter.

The master inverter 220 and the slave inverter 230 supply driving currents having an anti-phase to both sides of the backlight assembly 150 as shown in (A) and (B) of FIG. 4. For example, if the master inverter 220 supplies a driving current having a phase as shown in (A) of FIG. 4, the slave inverter 230 supplies a driving current having an anti-phase as shown in (B) of FIG. 4. A trans (not shown) which is included within the master inverter 220 and a trans (not shown) which is included within the slave inverter 230 are inversely wound to generate a phase inversion of such a driving current.

If the human body, etc is contacted with an output part of the master inverter 220 in the case where a driving current having a phase as shown in (A) of FIG. 4 is generated from the master inverter 220, a phase of a driving current which is generated from the master inverter 220 is inversed to be the same as a phase shown in (B) of FIG. 4. In this case, phases of feedback currents which are fed back from the master inverter 220 and the slave inverter 230 to the current limiting circuit 240 are the same.

In the same way, if the human body, etc is contacted with an output part of the slave inverter 230 in the case where a driving current having a phase as shown in (B) of FIG. 4 is generated from the slave inverter 230, a phase of a driving current which is generated from the slave inverter 230 is inversed to be the same as a phase shown in (A) of FIG. 4. In this case, phases of feedback currents which are fed back from the master inverter 220 and the slave inverter 230 to the current limiting circuit 240 are the same.

The current limiting circuit 240 is fed back with a current having an anti-phase from the master inverter 220 and the slave inverter 230 at an initial state to cut-off a predetermined enable signal which is applied to a ground, thereby applying the predetermined enable signal to the driving controller 210. On the contrary, if a current having the same phase is fed back from the master inverter 220 and the slave inverter 230 by contacting the human body, etc with an output part of the master inverter 220 or an output part of the slave inverter 230, the current limiting circuit 240 applies a predetermined enable signal to a ground. In this way, if a predetermined enable signal is applied to a ground not to be supplied to the driving controller 210, the driving controller 210 reduces a duty ratio of a pulse width modulation signal to decrease a level of a driving current of the backlight assembly 150 which is generated from the master inverter 220 and the slave inverter 230. In this state, if the human body, etc is spaced from the master inverter 220 or the slave inverter 230, a current having an anti-phase is fed back from the master inverter 220 and the slave inverter 230. Thus, the current limiting circuit 240 cuts-off a predetermined enable signal which is applied to a ground to apply the predetermined enable signal to the driving controller 210. Accordingly, the driving controller 210 restores a duty ratio of a pulse width modulation signal to 100%. In this way, if a duty ratio is restored to 100%, a driving current which is generated from the master inverter 220 and the slave inverter 230 is restored to the highest-level current.

Figure 5:
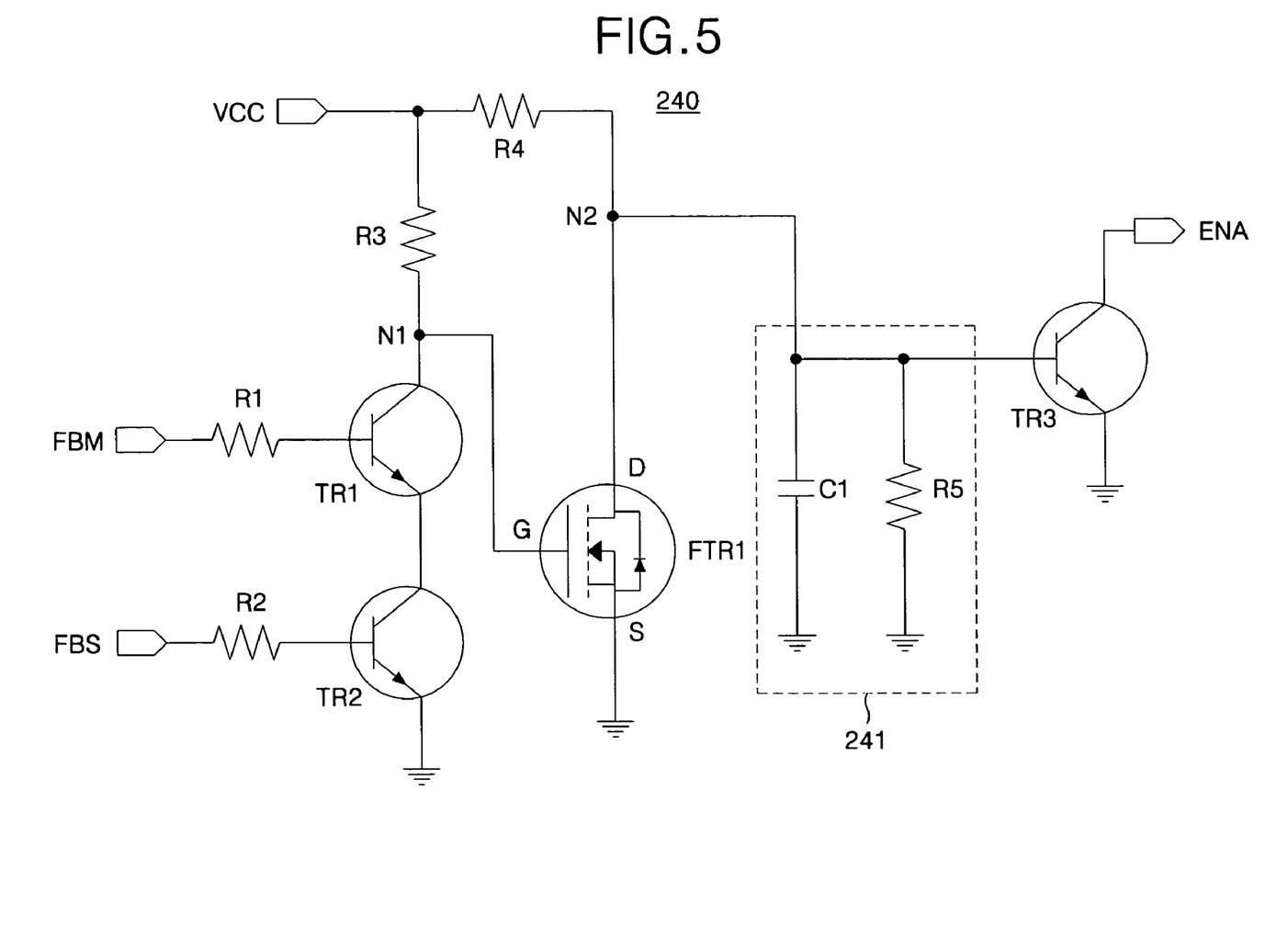
FIG. 5 is a circuit diagram showing the current limiting circuit in FIG. 3.

FIG. 5 is a circuit diagram showing the current limiting circuit in FIG. 3.

Referring to FIG. 5, the current limiting circuit 240 includes a first transistor TR1, a second transistor TR2, a field effect transistor FTR1 (hereinafter, referred to as "FET"), and a third transistor TR3. Herein, the first transistor TR1 is driven by a feed back current from the master inverter 220. The second transistor TR2 is driven by a feed back current from the slave inverter 230. The field effect transistor FTR1 is driven by a power voltage VCC. The third transistor TR3 is driven by a current which is generated by a power voltage VCC.

Furthermore, the current limiting circuit 240 further includes an integrator 241 that removes a noise.

The first transistor TR1 includes a base which is connected to a feed back terminal FBM to which a feed back current from the master inverter 220 is fed back, a collector which is connected to a node N1 to which a power voltage VCC is applied, and an emitter which is connected to a collector of the second transistor TR2. Herein, the first transistor TR1 is an N type bipolar transistor. If a positive feed back current which is fed back from the master inverter 220 is applied to a base, the first transistor TR1 is turned-on to switch a power voltage VCC which is applied to a node N1 to the second transistor TR2. On the contrary, if a negative feed back current which is fed back from the master inverter 220 is applied to a base, the first transistor TR1 is turned-off to cut-off a switching of a power voltage VCC which is applied to a node N1, thereby allowing a power voltage VCC with which a node N1 is applied to be applied to a gate of the FET FTR1. Herein, the current limiting circuit 240 further includes a resistor R1 which is connected between a base of the first transistor TR1 and the feed back terminal FBM.

The second transistor TR2 includes a base which is connected to a feed back terminal FBS to which a feed back current from the slave inverter 230 is fed back, a collector which is connected to an emitter of the first transistor TR1, and an emitter which is connected to a ground. Herein, the second transistor TR2 is an N type bipolar transistor. If a positive feed back current which is fed back from the slave inverter 230 is applied to a base, the second transistor TR2 is turned-on to switch a power voltage VCC with which a collector is supplied to a ground. On the contrary, if a negative feed back current which is fed back from the slave inverter 230 is applied to a base, the second transistor TR2 is turned-off to cut-off a switching of a power voltage VCC with which a collector is supplied. Herein, the current limiting circuit 240 further includes a resistor R2 which is connected between a base of the second transistor TR2 and the feed back terminal FBS.

The FET FTR1 includes a gate that is connected to a node N1 to which a power voltage VCC is applied and is connected to a collector of the first transistor TR1, a drain that is connected to a node N2 to which a power voltage VCC is applied, and a source which is connected to a ground. If a power voltage VCC with which a node N1 is applied is supplied to a gate, the FET FTR1 is turned-on to switch a power voltage VCC with which a drain is supplied via a node N2 to a ground. On the contrary, if a power voltage VCC with which a node N1 is applied is switched to a ground via the first and second transistors TR1 and TR2, the FET FTR1 is turned-off to cut-off a switching of a power voltage VCC with which a node N2 is applied, thereby allowing a power voltage VCC with which a node N2 is applied to be supplied to a base of the third transistor TR3.

The third transistor TR3 includes a base that is connected to a node N2 to which a power voltage VCC is applied, a collector that is connected to a signal supplying terminal to which a predetermined enable signal ENA is supplied, and an emitter that is connected to a ground. If the FET FTR1 is turned-off to be applied a power voltage VCC with which a node N2 is applied to a base, such a third transistor TR3 is turned-on to switch a predetermined enable signal ENA with which a collector is supplied to a ground. On the contrary, if a power voltage VCC with which a node N2 is applied is switched, via the FET FTR1, to a ground, the third transistor TR3 is turned-off to cut-off a predetermined enable signal ENA which is being switched to a ground. Thus, the third transistor TR3 applies a predetermined enable signal ENA to the driving controller 210.

On the other hand, the current limiting circuit 240 further includes resistors R3 and R4 which are connected in parallel between a power terminal and nodes N1 and N2 to which a power voltage VCC is applied.

The integrator 241 includes a capacitor C1 and a resistor R5. Herein, the end of one side of the capacitor C1 is commonly connected to a node N2 and a base of the third transistor TR3, and the end of the other side of the capacitor C1 is connected to a ground. The resistor R5 is connected in parallel to the capacitor C1. Furthermore, the end of one side of the resistor R5 is commonly connected to a node N2 and a base of the third transistor R3, and the end of the other side of the resistor R5 is connected to a ground. Such an integrator 241 removes a noise, which is mixed with a current with which a base of the third transistor TR3 is applied via a node N2.

An operation of the current limiting circuit of the present invention having such a circuit configuration will be described in detail as follows.

First, a case where the master inverter 220 and the slave inverter 230 are normally driven will be described. In other words, a case where the human body, etc is not contacted with an output part of the master inverter 220 or an output part of the slave inverter 230 will be described.

The master inverter 220 and the slave inverter 230 supply a driving current having an anti-phase as shown in FIG. 4. Thus, if the master inverter 220 and the slave inverter 230 are normally driven, a phase of a feed back current that is fed back from the master inverter 220 to be supplied to a base of the first transistor TR1 and a phase of a feed back current that is fed back from the slave inverter 230 to be supplied to a base of the second transistor TR2 are inversed each other. Accordingly, the first and second transistors TR1 and TR2 are alternatively turned-on/turned-off. In this way, the first and second transistors TR1 and TR2 are alternatively turned-on/turned-off, so that a power voltage VCC with which a node N1 is applied is supplied to a gate of the FET FTR1 to turn-on the FET FTR1.

In this way, if the FET FTR1 is turned-on, a power voltage VCC with which a node N2 is applied is switched to a ground. Thus, a base of the third transistor TR3 is not supplied with a current. As a result, the third transistor TR3 is turned-off. In this way, if the third transistor TR3 is turned-off, a predetermined enable signal ENA is not switched to a ground and is supplied to the driving controller 210. Accordingly, the driving controller 210 maintains a duty ratio of a pulse width modulation signal which is being supplied to the master inverter 220 to 100% in response to the supplied predetermined enable signal ENA.

Next, a case where the master inverter 220 and the slave inverter 230 are abnormally driven will be described. In other words, a case where the human body, etc is contacted with an output part of the master inverter 220 or an output part of the slave inverter 230 will be described.

If the human body, etc is contacted with an output part of the master inverter 220 or an output part of the slave inverter 230, a phase of a driving current is inversed. Thus, if the master inverter 220 and the slave inverter 230 are abnormally driven, a phase of a feed back current that is fed back from the master inverter 220 to be supplied to a base of the first transistor TR1 and a phase of a feed back current that is fed back from the slave inverter 230 to be supplied to a base of the second transistor TR2 are the same each other. In this case, the first and second transistors TR1 and TR2 are simultaneously turned-on. As a result, a power voltage with which a node N1 is applied is not supplied to a gate of the FET FTR1 and is switched, via the first and second transistors TR1 and TR2, to a ground.

If a power voltage VCC, which is applied to a node N1, is applied to a ground, the FET FTR1 is turned-off and, at the same time a power voltage VCC, which is applied to a node N2, is a base of the third transistor TR3. Thus, the third transistor TR3 is turned-on by a current which is generated by a power voltage VCC to switch a predetermined enable signal ENA to a ground. Since a predetermined enable signal ENA is not supplied to the driving controller 210, the driving controller 210 reduces a duty ratio of a pulse width modulation signal, which is being supplied to the master inverter 220 to decrease a driving current of the backlight assembly 150.

In this state, if the human body, etc is spaced from the master inverter 220 and the slave inverter 230, the master inverter 220 and the slave inverter 230 are converted into a normal driving state. In this way, if the master inverter 220 and the slave inverter 230 are converted into a normal driving state, feed back currents which are fed back from the master inverter 220 and the slave inverter 230 to the current limiting circuit 240 have an anti-phase. Thus, a predetermined enable signal ENA is supplied to the driving controller 210. Accordingly, the driving controller 210 restores a duty ratio of a pulse width modulation signal to 100% to restore a driving current of the backlight assembly 150.

As described above, the present invention automatically reduces a driving current of a light source when the human body is contacted with an output part of the master inverter and/or the slave inverter. In this state, if the human body is spaced from an output part of the master inverter and/or the slave inverter, the present invention automatically restores a driving current of a light source to prevent the user from being damaged by a driving current, which is being supplied from the master inverter and/or the slave inverter.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A driving apparatus of a liquid crystal display device, comprising:
   a driving controller that reduces or restores a duty ratio of a driving control signal which controls a generation of a driving current of a backlight assembly in accordance with whether a predetermined enable signal is applied or not;
   a master inverter that reduces or restores a level of a driving current of the backlight assembly in accordance with a duty ratio of a driving control signal from the driving controller;

a slave inverter that reduces or restores a level of a driving current of the backlight assembly in accordance with a duty ratio of the driving control signal; and a current limiting circuit that applies the predetermined enable signal to a ground or the driving controller in accordance with a phase of feedback currents from the master inverter and the slave inverter, wherein the predetermined enable signal is supplied to the driving controller when an output signal of the master inverter and a output signal of the slave inverter have the same phase, and wherein the predetermined enable signal is not supplied to the driving controller when the output signal of the master inverter and the output signal of the slave inverter have the different phase.

2. The driving apparatus of the liquid crystal display device according to claim 1, wherein the driving control signal is a pulse width modulation signal.

3. The driving apparatus of the liquid crystal display device according to claim 2, wherein if a supply of the predetermined enable signal is cut-off, the driving controller reduces a duty ratio of the pulse width modulation signal.

4. The driving apparatus of the liquid crystal display device according to claim 3, wherein if a duty ratio of the pulse width modulation signal is reduced, the master inverter and the slave inverter reduce a level of a driving current of the backlight assembly proportional to the reduced duty ratio.

5. The driving apparatus of the liquid crystal display device according to claim 3, wherein if the cut-off predetermined enable signal is re-supplied, the driving controller restores a duty ratio of the pulse width modulation signal.

6. The driving apparatus of the liquid crystal display device according to claim 5, wherein if a duty ratio of the pulse width modulation signal is restored, the master inverter and the slave inverter restore a level of a driving current of the backlight assembly.

7. The driving apparatus of the liquid crystal display device according to claim 2, wherein if feedback currents which are fed back from the master inverter and the slave inverter have an anti-phase, the current limiting circuit applies the predetermined enable signal to a ground.

8. The driving apparatus of the liquid crystal display device according to claim 2, wherein if feedback currents which are fed back from the master inverter and the slave inverter have the same phase, the current limiting circuit applies the predetermined enable signal to the driving controller.

9. The driving apparatus of the liquid crystal display device according to claim 2, wherein the current limiting circuit includes:
a first transistor that is turned-on/turned-off by a feedback current from the master inverter;
a second transistor that is turned-on/turned-off by a feedback current from the slave inverter;
a field effect transistor that is driven by a power voltage which is applied when the first and second transistors are alternatively turned-on/turned-off; and
a third transistor that is turned-on by a current which is generated by the power voltage which is applied when the field effect transistor is turned-off to switch the predetermined enable signal to a ground.

10. A driving apparatus of a liquid crystal display device, including a master inverter and a slave inverter that supply a driving current to a backlight assembly, and a driving controller that controls a driving of the master inverter and the slave inverter comprising:
a current limiting circuit that applies a predetermined enable signal to a ground or a driving controller in accordance with a phase of feedback currents from the master inverter and the slave inverter, and the current limiting current includes:
a first switching device that is turned-on/turned-off by a feedback current from the master inverter;
a second switching device that is turned-on/turned-off by a feedback current from the slave inverter;
a third switching device that is driven by a power voltage which is applied when the first and second switching devices are alternatively turned-on/turned-off; and
a fourth switching device that is turned-on by a current which is generated by the power voltage which is applied when the third switching device is turned-off to switch the predetermined enable signal to a ground.

11. The driving apparatus of the liquid crystal display device according to claim 10, wherein the first switching device is a bipolar transistor having a base to which a feedback current is applied from the master inverter, a collector which is connected to a first node to which the power voltage is applied, and an emitter which is connected to the second switching device.

12. The driving apparatus of the liquid crystal display device according to claim 11, wherein the second switching device is a bipolar transistor having a base to which a feedback current is applied from the slave inverter, a collector which is connected to an emitter of the first switching device, and an emitter which is connected to a ground.

13. The driving apparatus of the liquid crystal display device according to claim 11, wherein the third switching device is a field effect transistor having a base which is connected to the first node to which the power voltage is applied, a drain which is connected to a second node to which the power voltage is applied, and a source which is connected to a ground.

14. The driving apparatus of the liquid crystal display device according to claim 13, wherein the fourth switching device is a bipolar transistor having a base which is connected to the second node to which the power voltage is applied, a collector to which the predetermined enable signal is applied, and an emitter which is connected to a ground.

15. A method of driving a liquid crystal display device, comprising:
generating a driving control signal that controls a generation of a driving current of a backlight assembly in accordance with whether a predetermined enable signal is applied or not by a driving controller;
generating a first and second driving currents to supply them to the backlight assembly and feeding back the first and second driving currents in accordance with the driving control signal; and
reducing or restoring a duty ratio of the driving control signal in accordance with a phase of the fed back first and second driving currents,
wherein the predetermined enable signal is supplied to the driving controller when the first and second driving currents have the same phase, and
wherein the predetermined enable signal is not supplied to the driving controller when the first and second driving currents have the different phase.

16. The method of driving the liquid crystal display device according to claim 15, wherein the driving control signal is a pulse width modulation signal.

17. The method of driving the liquid crystal display device according to claim 16, wherein the step of reducing or restoring a duty ratio of the driving control signal reduces a duty ratio of the pulse width modulation signal if a phase of the fed back first driving current is different from a phase of the fed back second driving current.

18. The method of driving the liquid crystal display device according to claim 17, wherein the step of reducing or restoring a duty ratio of the driving control signal restores a duty ratio of the pulse width modulation signal if a phase of the fed back first driving current is the same as a phase of the fed back second driving current in a state in which a duty ratio of the pulse width modulation signal is reduced.

* * * * *